United States Patent [19]

Volp

[11] Patent Number: 4,659,942
[45] Date of Patent: Apr. 21, 1987

[54] FAULT-TOLERANT POWER DISTRIBUTION SYSTEM

[75] Inventor: Jeffrey A. Volp, North Andover, Mass.

[73] Assignee: The Charles Stark Draper Laboratory, Inc., Cambridge, Mass.

[21] Appl. No.: 740,828

[22] Filed: Jun. 3, 1985

[51] Int. Cl.[4] .............................................. H02B 1/24
[52] U.S. Cl. ...................................... 307/19; 307/42; 307/113; 307/112; 361/93
[58] Field of Search ........................ 307/11, 18, 19, 20, 307/43, 44, 51, 64, 65, 148, 149, 42, 150, 113, 112; 361/87, 93, 100, 101

[56] References Cited

U.S. PATENT DOCUMENTS 4,429,339  1/1984  Jaeschke et al. ........................ 361/93
4,480,193 10/1984  Blahous et al. ......................... 307/19

Primary Examiner—William M. Shoop, Jr.
Assistant Examiner—Shik Luen Paul Ip
Attorney, Agent, or Firm—Robert F. O'Connell

[57] ABSTRACT

A fault-tolerant power distribution system which includes a plurality of power sources and a plurality of nodes responsive thereto for supplying power to one or more loads associated with each node. Each node includes a plurality of switching circuits, each of which preferably uses a power field effect transistor which provides a diode operation when power is first applied to the nodes and which thereafter provides bi-directional current flow through the switching circuit in a manner such that a low voltage drop is produced in each direction. Each switching circuit includes circuitry for disabling the power field effect transistor when the current in the switching circuit exceeds a preselected value.

12 Claims, 5 Drawing Figures

FAULT-TOLERANT POWER DISTRIBUTION SYSTEM

This invention was made with Government support under Contract NAS9-16023 awarded by NASA. The Government has certain rights in this invention.

INTRODUCTION

This invention relates generally to power distribution systems and, more particularly, to such systems designed to provide fault-tolerant operation using redundant power sources.

BACKGROUND OF THE INVENTION

Many systems require redundant sources of electrical power in order to insure correct operation even when one or more power sources may fail during operation. Computer systems, for example, are particularly sensitive to power supply interruptions of any duration. Such systems are now being designed so as to be tolerant of the failure of one or more hardware components of the system before the system as a whole fails and must be shut down. Consequently, the power delivered to such computer systems must also have a similar degree of fault tolerance.

Fault-tolerant systems are particularly necessary in systems used in applications in which a failure could have diasastrous results, as in systems controlling the operation of spacecraft and satellites which systems, when failure occurs, are very difficult or, in some cases, substantially impossible to repair. In other systems, failure of a computer portion thereof may cause damage to other parts of the system with which it is interconnected. A prime example of such a problem arises in systems for controlling nuclear reactors. Further, high performance aircraft, for example, are inherently unstable and cannot be directly controlled by the pilot and so a fault-tolerant flight control system for such aircraft becomes a necessity.

In current fault-tolerant power distribution systems in which a plurality of redundant power sources are normally used, if one source fails the others can be utilized to make up the failure and to provide the necessary power for the system. A common practice in this regard is to use "diode-or" circuitry which interconnects two or more power sources to each load. Such an approach has disadvantages, however, particularly when dealing with relatively low voltage power sources, such as the common 5-volt power supply used in microprocessor systems. Diodes have forward voltage drops which may approach a substantial portion, e.g., up to 20% in some cases, of the supply voltage itself and may represent a significant waste of power in such systems. Such voltage drops vary with both load current and temperature and the presence of large changes in load current or temperature may, therefore, cause the supply voltage to exceed the required tolerance levels.

In addition, where a large number of loads and power sources are utilized, the use of diode-or circuitry may require large number of additional wires in order to distribute the power throughout the power source/load network.

A further disadvantage of a simple diode-or configuration is that a short to ground at one load can bring down the power supplied to all loads unless some form of overcurrent protection is employed. Typical designs use fuses for this purpose, which have to be manually replaced in event of opening.

Such disadvantages make the simple diode-or circuit approach less desirable in many applications and in some cases effectively unusable. Hence, it is desirable that a better approach to the redundant power distribution problem be devised to prevent the disadvantages of wasted power and excessive wiring requirements of the diode-or technique.

BRIEF SUMMARY OF THE INVENTION

In accordance with the invention, a power distribution system uses a plurality of switching circuits appropriately interconnected between a plurality of power sources and a plurality of load circuits. The switching circuits include means for providing a diode-or operation during start-up, i.e., when power is first applied to the loads, and for providing thereafter a bi-directional current flow therethrough, while at the same time producing a very low voltage drop (low power loss) in each direction. If a power source failure occurs with respect to a particular one of the multiple power sources, the switching circuitry associated therewith continues to provide a low resistance to current flow and is further arranged so that, if the current level therethrough exceeds a preselected value, the switching circuit is opened, i.e., it becomes suitably isolated from the rest of the circuitry. In a preferred embodiment, for example, such circuit means can include a power field effect transistor (FET) device connected to a suitable current sensing feedback circuit for switching the FET off when a preselected current level is reached or exceeded.

By using such switching circuitry in the context of a fault-tolerant power distribution system, the problems of excessive voltage drop and excessive wiring arising in previously used circuitry are overcome.

DESCRIPTION OF THE INVENTION

The invention can be described in more detail with the help of the accompanying drawings wherein FIG. 1 shows a block diagram of an exemplary embodiment of the invention using a plurality of power sources and a plurality of loads;

Figure 1:
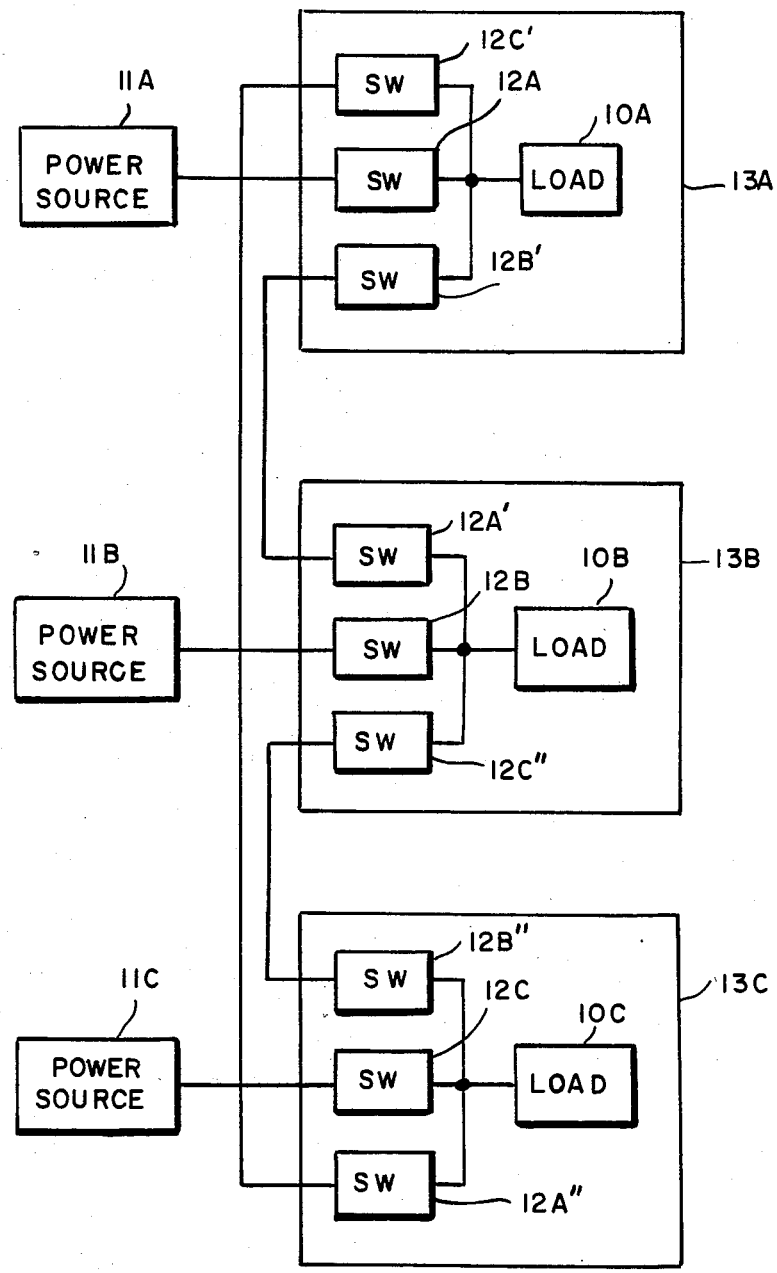

As can be seen in FIG. 1, a plurality of loads 10A, 10B and 10C are required to be supplied with power from a plurality of power sources 11A, 11B and 11C. In the particular exemplary embodiment discussed, the number of power sources and loads is shown for convenience as including three such sources and three such loads, although it is understood that the number of power sources and the number of loads need not be equal and, as discussed further below, while at least two redundant sources are needed, the numbers of sources and loads may exceed the three depicted.

In accordance with the specific embodiment of FIG. 1, each of the sources 11A–11C is connected to an associated load through a switching circuit 12A, 12B and 12C, respectively. The output of each such switching circuit is in turn connected to each of the other two loads through additional switching circuits. Thus, power source 11A is connected through switching circuit 12A to load 10B via switching circuit 12B' and switching circuit 12A' and is further connected to load 10C through switching circuit 12A via switching circuits 12C' and 12A".

In a similar manner power source 11B is connected to load 10B through switching circuit 12B and further to load 10A via switching circuits 12A' and 12B' and to load 10C via switching circuits 12C" and 12B". Power source 11C is connected to load 10C through switching circuit 12C and in turn to load 10A via switching circuits 12A" and 12C" and to load 10B via switching circuits 12B" and 12C".

The characteristics of switching circuits 12A, 12B, 12C, 12A', 12B', 12C', 12A", 12B" and 12C" are such that during start-up, i.e. when power sources 11A-11C are turned on to supply initial power to the loads, the switching circuits act, in effect, as diode circuits for such purpose. After start-up and during normal operation, such switching circuits effectively act as very low resistance means between the power sources and the loads.

The power sources all have the same nominal voltage and in normal operation the currents supplied to the loads accordingly assume the necessary levels as desired. In normal operation, for example, each of the power sources supplies the necessary current for its associated load and, absent variations in the loads or in the power source voltage outputs, such conditions will prevail. Should the power source voltage outputs vary, the current distribution among the power sources and the currents through the loads may vary accordingly.

After start-up, the switching circuits provide a very low "on-resistance" and the voltage drops across the switching circuits are reduced to very low values. The voltages applied to each of the loads are substantially close to those in each of the adjacent loads and the overall circuitry can be looked upon as a network having three nodes 13A, 13B and 13C, each comprising switching circuits and associated loads, interconnected by wires, each of the switching circuits having a very small, finite resistance. Any load which receives power from a power source whose output is somewhat lower than that of the other power sources will automatically receive the required additional power from each of the other sources indirectly through other load circuit switching circuits. It should be noted that only a single wire is required from each node to each adjacent node in order to provide the adjacent nodes with secondary sources of power. When not all of the power sources have exactly the same voltages, the sources whose voltages are higher will tend to carry more of the load. However, because the switching circuits are arranged to act as low value resistances after turn-on, the transition from one power source to an adjacent power source is more gradual than would occur in the common diode-or configurations in which such transitions can be very abrupt. Using power sources designed to have a degree of voltage compliance can further ease the transition from one power source to another.

When a failure occurs, i.e., a power source fails, powre sources from adjacent nodes pick up the load of the failed power source thereby causing slight reductions in the voltages of all of the interconnected loads due to the on-resistance of the switching circuits. It becomes necessary then to provide local control of the current switching circuits in the event that such a failure causes an excessive current drain to occur in the failed node. Overcurrent protection is provided in the switching circuits such that, should the current supplied by one node to an adjacent node exceed a preselected value, the switching circuit supplying current to that node will be entirely switched off. Such control prevents excessive current drain of a failed node from overloading the supply of each of the adjacent loads, thereby isolating the failed node.

Figure 2:
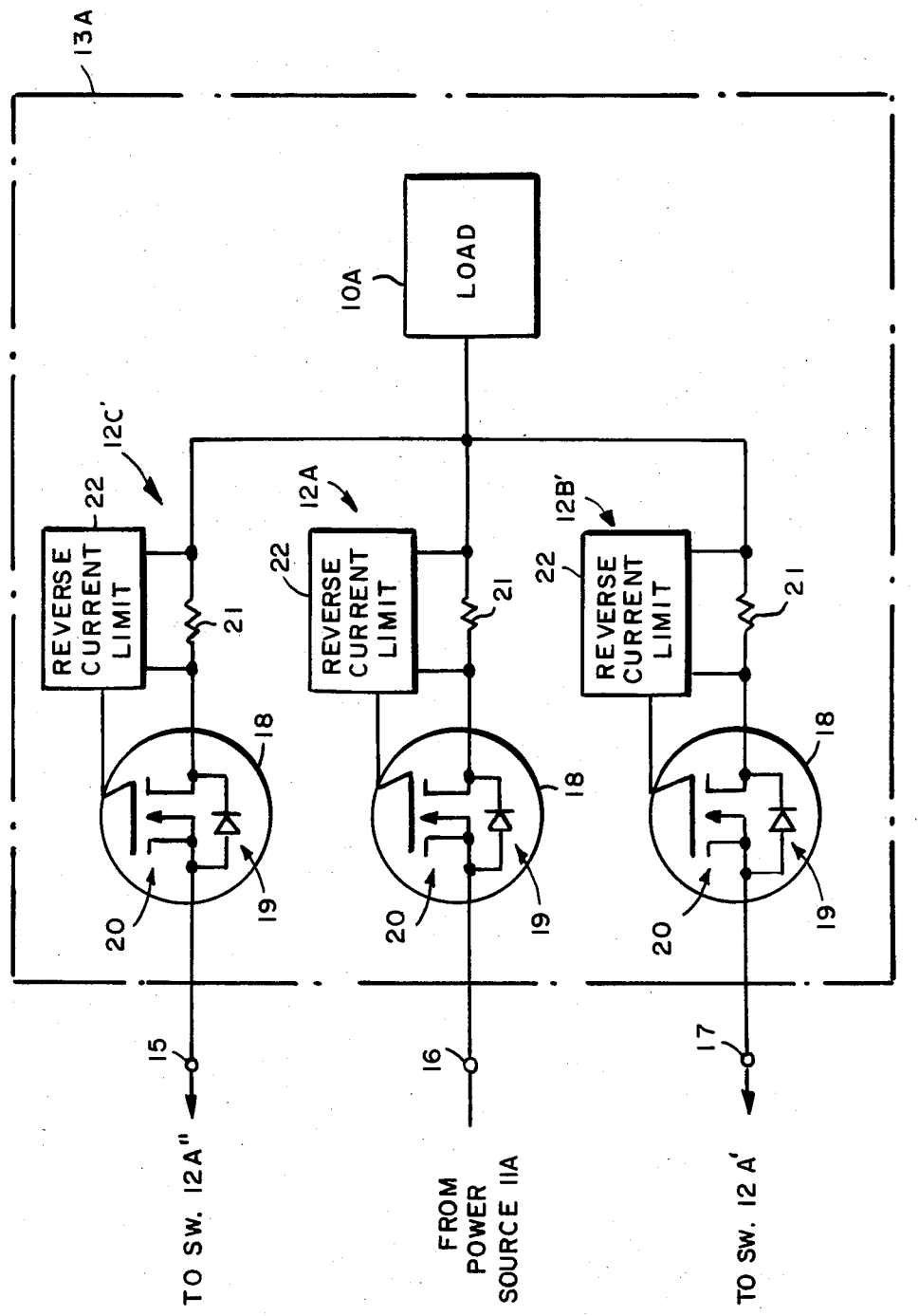
FIG. 2 shows a part schematic diagram and part block diagram of a portion of the system of FIG. 1.

FIG. 2 shows in more detail a partial schematic, partial block diagram of an exemplary node, e.g., node 13A of FIG. 1, having a plurality of switching circuits 12A, 12B', 12C'. The node as exemplified in FIG. 2 has three input interconnections indicated in FIG. 2 as interconnections 15, 16 and 17 and the node is used in association with load 10A. Each switching circuit includes an FET 18 which may be, for example, a power field-effect transistor of the type made and sold by International Rectifier Co. under the model designation IRF530. However, the on resistance and voltage rating of the power FET are optimally selected for a given power distribution network. Each FET, for example has a body-drain diode portion 19 and an FET switching portion 20. When power is initially turned on, the initial current is carried through the FET's body-drain diode 19. This initially powers up the circuits 12A, 12B', 12C', and, after such start-up, the power FET's switching portions are turned on, thereby significantly reducing the voltage drop through the switching circuit to a fraction of that of the diode portion 19. A sensing resistor 21 is placed in series with power FET 18 so as to sense the current therethrough which is being supplied to load 10A. Such current is monitored by a reverse current limit circuit 22 in each switching circuit so that, should that current through the sensing resistor 21 exceed a preselected value, the reverse current limit circuit switches off, or disables, the FET 18 so as to remove the excessive current drain.

Figure 3:
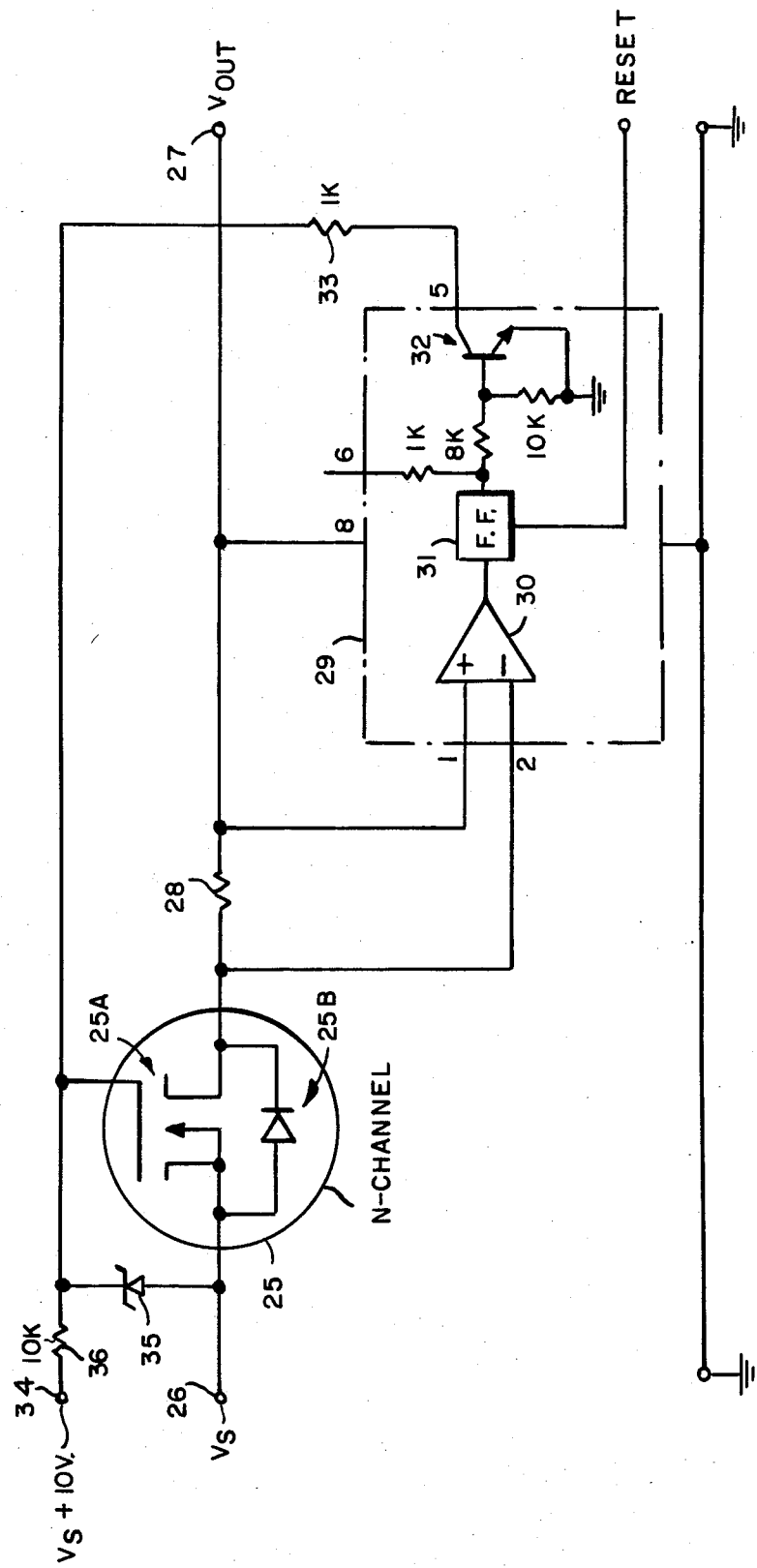
FIG. 3 shows a more specific schematic diagram of a portion of the system shown in FIG. 2.

A specific implementation for an exemplary switching circuit is shown in one embodiment in FIG. 3 for an N-channel current switch. As can be seen therein, an N-channel power FET 25 having a suitable diode portion 25A and switching portion 25B as discussed above is connected in series with a voltage source 26 which provides a voltage $V_S$ thereto for producing an output voltage $V_{OUT}$ at an output terminal 27. A sensing resistor 28 is placed in series with FET 25. FET 25 may be, for example, an N-channel FET such as manufactured and sold by International Rectifier Co., under the model designation IRF530. A reverse current limiting circuit 29 is connected across sensing resistor 28 and comprises a threshold detector 30, the plus and minus inputs of which are connected across resistor 28 as shown. The output thereof is supplied to a flip-flop circuit 31 the state of which depends on the relative values of the inputs to the threshold detector 30. The output of flip-flop 31 is supplied through suitable inverter transistor circuit 32 in a feedback path to the gate of FET 25 through a suitable feedback resistor 33, a 1 K-ohm resistor. Sensing resistor 28, for example, is selected to develop 100 mv of voltage drop at the desired trip current.

The reverse current limit circuit 29 may be obtained in the form of a known integrated circuit component such as made and sold by Silicon General Corp. under the model designation SG3549. The latter component has the exemplary pin numbers as indicated in FIG. 3, pin 4 being connected to a suitable ground terminal as shown. Pin 8 is connected to the $V_{OUT}$ terminal 27. A +5 volt pulse is applied to pin 7 to reset flip-flop 36 at power turn on or after the current limit has been tripped. The gate of N-channel FET 25 is connected through 10K resistor 36 to an auxiliary voltage source 34 which is greater than voltage source 26. In the particular embodiment disclosed, for example, where voltage source 26 may be nominally 5 volts, auxiliary voltage source 34 may supply a voltage which is equal to $V_s$ plus 10 volts. A Zener diode 35 is connected between the gate and source of field effect transistor 25 for protecting said transistor.

The circuitry of FIG. 3 represnts a specific embodiment of the switching circuits discussed above with reference to FIGS. 1 and 2 and can be successfully used to perform the functions desired as so disclosed. Thus, when the system is turned on, FET 25 acts initially through its diode portion 25B and, after the reset pulse is applied, the switching portion 25A thereof operates (i.e., is turned on) and the source voltage 26 is connected to the output terminal 27 through what amounts to a very low resistance. If the current supplied backwards through the switching circuit to its power source, as sensed by sensing resistor 28, exceeds a preselected value as determined by the operation of current limiting circuit 29, the flip-flop circuit 31 is actuated so as to provide a feedback voltage which shuts off FET 25 so as to essentially produce an open circuit between voltage source 26 and output terminal 27 so as to isolate the power source 26 and prevent an excessive current drain.

Figure 4:
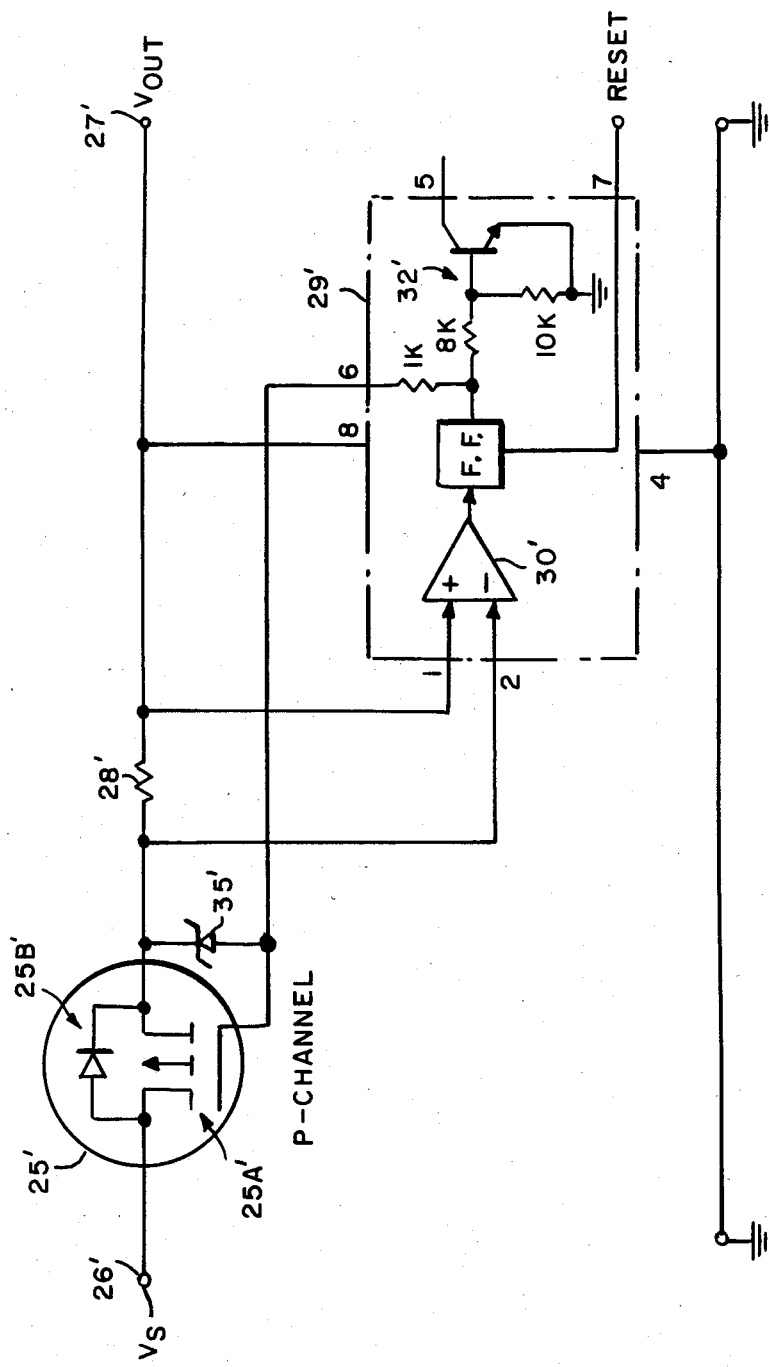
FIG. 4 shows a schematic diagram of an alternative embodiment of a portion of the system shown in FIG. 2.

An alternative embodiment of such a switching circuit is shown in FIG. 4 for a P-channel current switch using a P-channel FET 25', such as made and sold by International Rectifier Co. under the model designation IRF9530. The circuitry of FIG. 4 uses sensing resistor 28' and reverse current limiter circuit 29', and Zener diode 35' and effectively operates to perform substantially the same start-up and subsequent operation, as well as the current feedback shut-ff operation, as discussed with reference to the N-channel current switching circuit of FIG. 3 without the requirement for a secondary voltage source ($V_s+10v$).

The switching circuits of FIGS. 3 or 4 can be utilized in the particular exemplary configuration of FIGS. 1 and 2 to provide the operations discussed above. In such configuration all of the switching circuits are connected in a network to provide very low resistance in each switching path during normal operation and are arranged so that current is automatically re-routed around any fault that occurs. Overcurrent protection is provided on the output of each switching circuit and should the current being supplied to an adjacent node exceed a predetermined value, the power FET supplying current to that node will be switched off so as to prevent excessive current drain on the failed node from overloading the supplies of adjacent nodes, thereby isolating the failed node.

The circuitry shown anticipates various types of failures. For example, the power FET in a switching circuit could either fail by shorting or by opening. Moreover, the current protection circuitry could fail by either remaining always on or always off. The overall circuit has been designed so that a single failure in the current switch will not cause a failure of the power being supplied to its particular load. Since the network such as shown in FIG. 1 is designed to consist of at least two current switches in association with each load (in the particular embodiment shown three are utilized with each load), should one of the switching circuits fail in the open state, the affected load would still be powered through the remaining switching circuits. If a current switch fails in a shorted state, such condition would only cause a problem if the switching circuit would have to be turned off in the event of a second failure. It would then be the responsibility of the systems fault detection and isolation routines to uncover these "latent" failures before a second failure could occur. The failure of the current protection circuit would have effects similar to the failures due to open or shorted power FETs.

Figure 5:
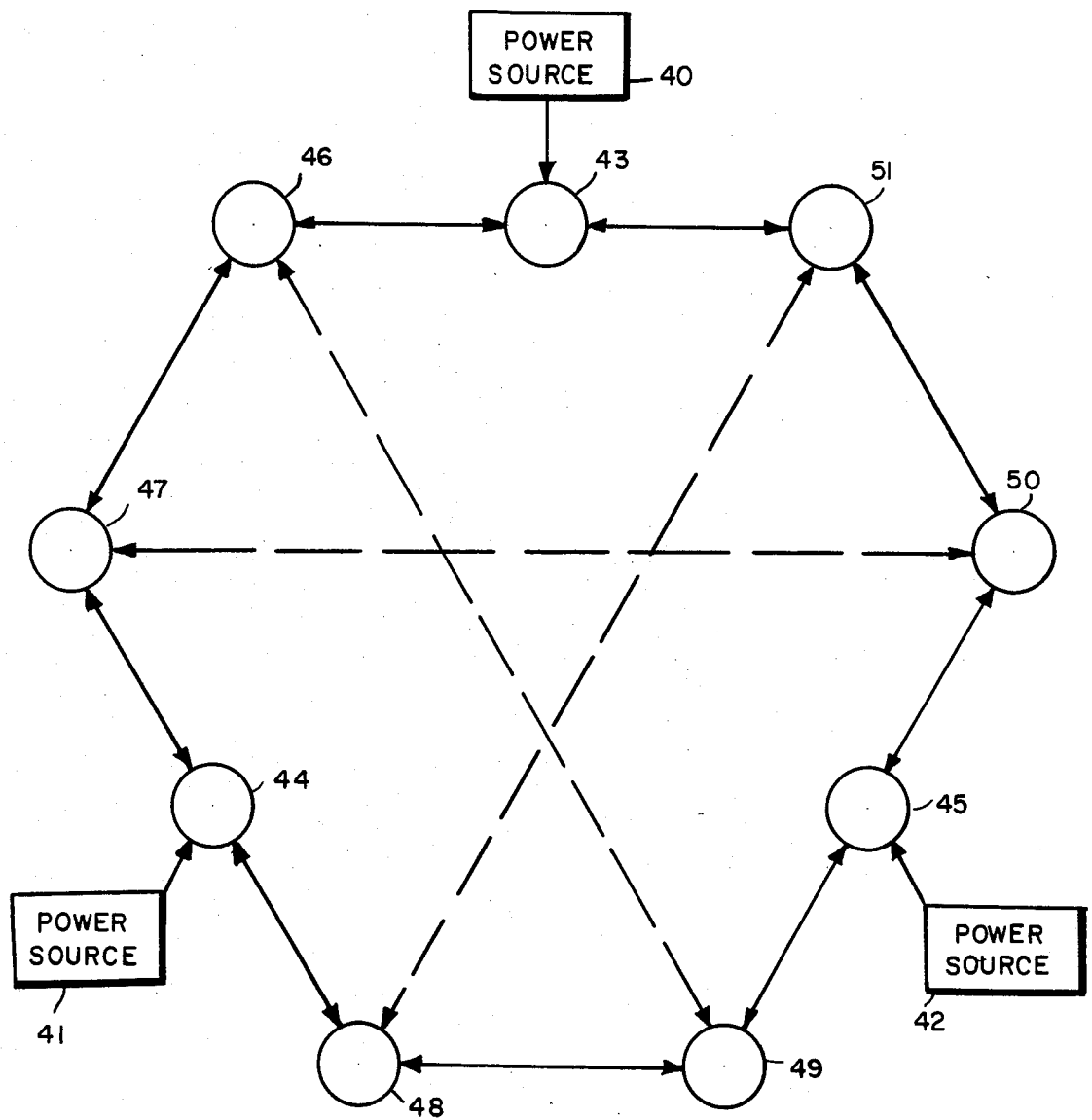
FIG. 5 shows a block diagram of an exemplary embodiment of a more extensive power distribution network in which the invention can be used.

FIG. 5 depicts a more generalized and more extensive network of nodes (each having an appropriate load) and power sources wherein the number of nodes being supplied with power for the loads therein is greater than the number of power sources utilized. The exemplary network shown therein is depicted for three sources and nine nodes (loads). Thus, power sources 40, 41 and 42 supply voltages directly to nodes 43, 44 and 45, each of said nodes having a load connected therein. A plurality of additional nodes 46-51 are also supplied by power sources 40-42 indirectly via nodes 43-45. In one specific embodiment thereof (shown by the solid lines, for example), each of the nodes which is not directly supplied by a power source receives its powe via nodes 43-45 from the solid interconnections therewith as shown. In such case, nodes 46-51 each have two switching circuits included therein which provide two paths for obtaining power indirectly from appropriate ones of the power sources 40-42. In the solid-line embodiment, only nodes 43, 44 and 45 would utilize three switching circuits, one of which is connected directly to one of the power sources.

In order to provide even further redundancy, however, it is possible to additionally interconnect nodes 46-51 in the manner shown by the dashed lines so as to provide each of such nodes with three power source paths via three switching circuits in each node. The number of nodes and the number of power sources can be selected for the particular application involved.

While the particular embodiments discussed above represent exemplary embodiments of the invention, modifications thereto may occur to those in the art within the spirit and scope of the invention. Hence the invention is not to be construed as limited to the particular embodiments disclosed, except as defined by the appended claims.

What is claimed is:
1. A fault-tolerant DC power distribution system comprising
   a plurality of DC power sources;
   a plurality of nodes responsive to said power sources for supplying power to one or more loads associated with said nodes, each of said nodes including a plurality of switching circuits each of which comprises
   means for automatically providing a diode operation to supply DC power to the load of said node when power is first applied to said nodes from said power sources;
   means for thereafter providing bi-directional DC current flow through said switching circuit in a manner such that a low voltage drop is produced in each direction; and means in series with said bi-directional current providing means for disabling said switching circuit when the current therein exceeds a preselected value.

2. A fault-tolerant power distribution system in accordance with claim 1 wherein the number of DC power sources is the same as the number of nodes and each node is directly responsive to a selected power source and is indirectly responsive to at least one remaining power source.

3. A fault-tolerant power distribution system in accordance with claim 2 wherein the number of switching circuits in each node is the same as the number of said power sources.

4. A fault-tolerant power distribution system in accordance with claim 1 wherein the number of power sources is les than the number of nodes, a selected number of nodes being directly responsive to a selected pwoer source and indirectly responsive to at least one remaining power source, and the remaining number of nodes being indirectly responsive to at least two of said power sources.

5. A fault-tolerant power distribution system in accordance with claim 4 wherein each of said selected number of nodes includes at least three switching circuits connecting said node with its selected power source and with nodes adjacent thereto, and each of said remaining number of nodes includes at least two switching circuits interconnecting said node with nodes adjacent thereto.

6. A fault-tolerant power distribution system in accordance with claim 4 wherein each of said selected number of nodes including at least three switching circuits interconnecting said node with its selected power source and with nodes adjacent thereto, and each of said remaining number of nodes includes at least three switching circuits interconnecting said node with nodes adjacent thereto and with at least one other non-adjacent node.

7. A fault-tolerant power distribution system in accordance with claims 1, 2, 3, 4, 5 or 6, wherein each of said swtiching circuits includes a power field effect transistor means having a body-drain diode portion for providing said diode operation and a field effect transistor switching portion for providing said bi-directional current flow operation.

8. A fault-tolerant power distribution system in accordance with claim 7 wherein the disabling means in each of said switching circuits disables said power field effect transistor means when the current in said switching circuit exceeds a preselected value.

9. A fault-tolerant power distribution system in accordance with claim 8 wherein said disabling means includes means for sensing the current in said switching circuit; and means responsive to said sensing means for switching off the power field effect transistor means when the currnet sensed by said sensing means exceeds a preselected value.

10. A fault-tolerant power distribution system in accordance with claim 9 wherein said last named means is a reverse current limit circuit comprising a threshold detector connected to said sensing means for providing an output which depends on the relative voltage values across said sensing means;

a flip-flop means responsive to the output of said threshold detector for providing an output the state of which depends on the output of said threshold detector; and inverter circuit means responsive to the output of said flip-flop means and to said field effect transistor means for disabling said transistor means when said flip-flop output is in a selected state.

11. A fault-tolerant power distribution system in accordance with claim 7 wherein said power field effect transistor means includes an N-channel field effect transistor.

12. A fault-tolerant power distribution system in accordance with claim 7 wherein said power field effect transistor means includes a P-channel field effect transistor.

* * * * *